June 24, 1930.  C. F. MOSES  1,767,390
GANG SAW
Filed May 9, 1929    3 Sheets-Sheet 1
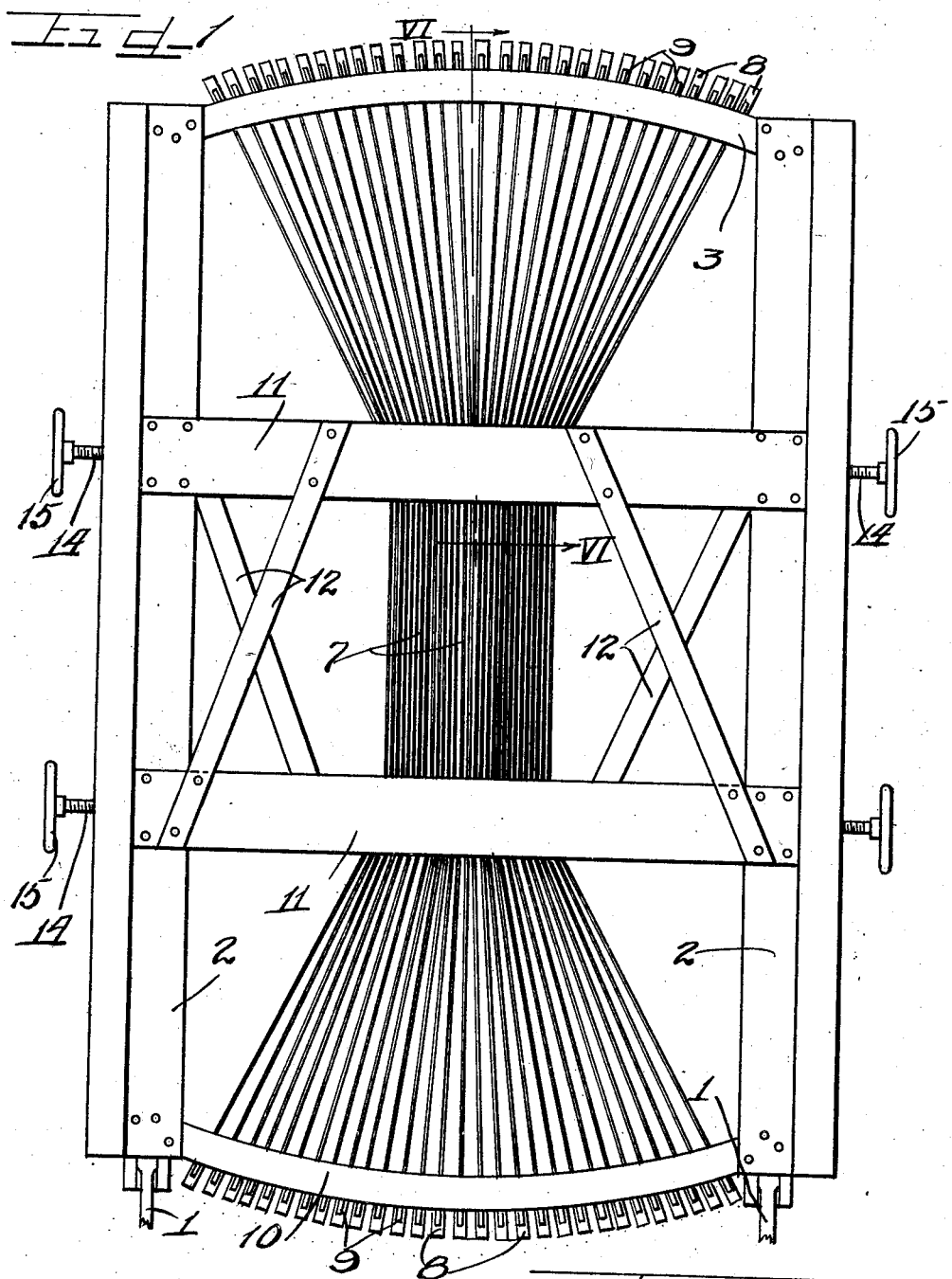

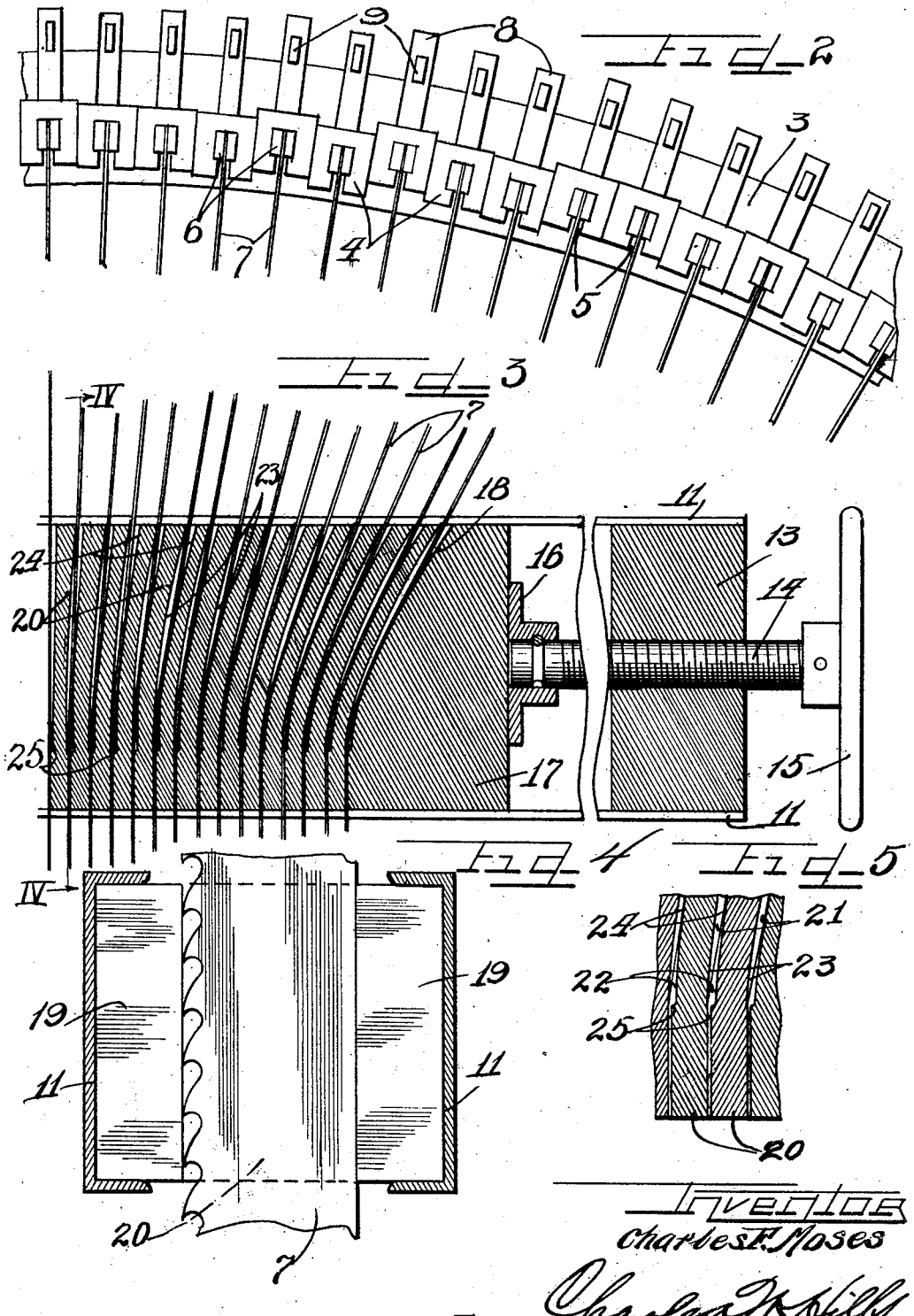

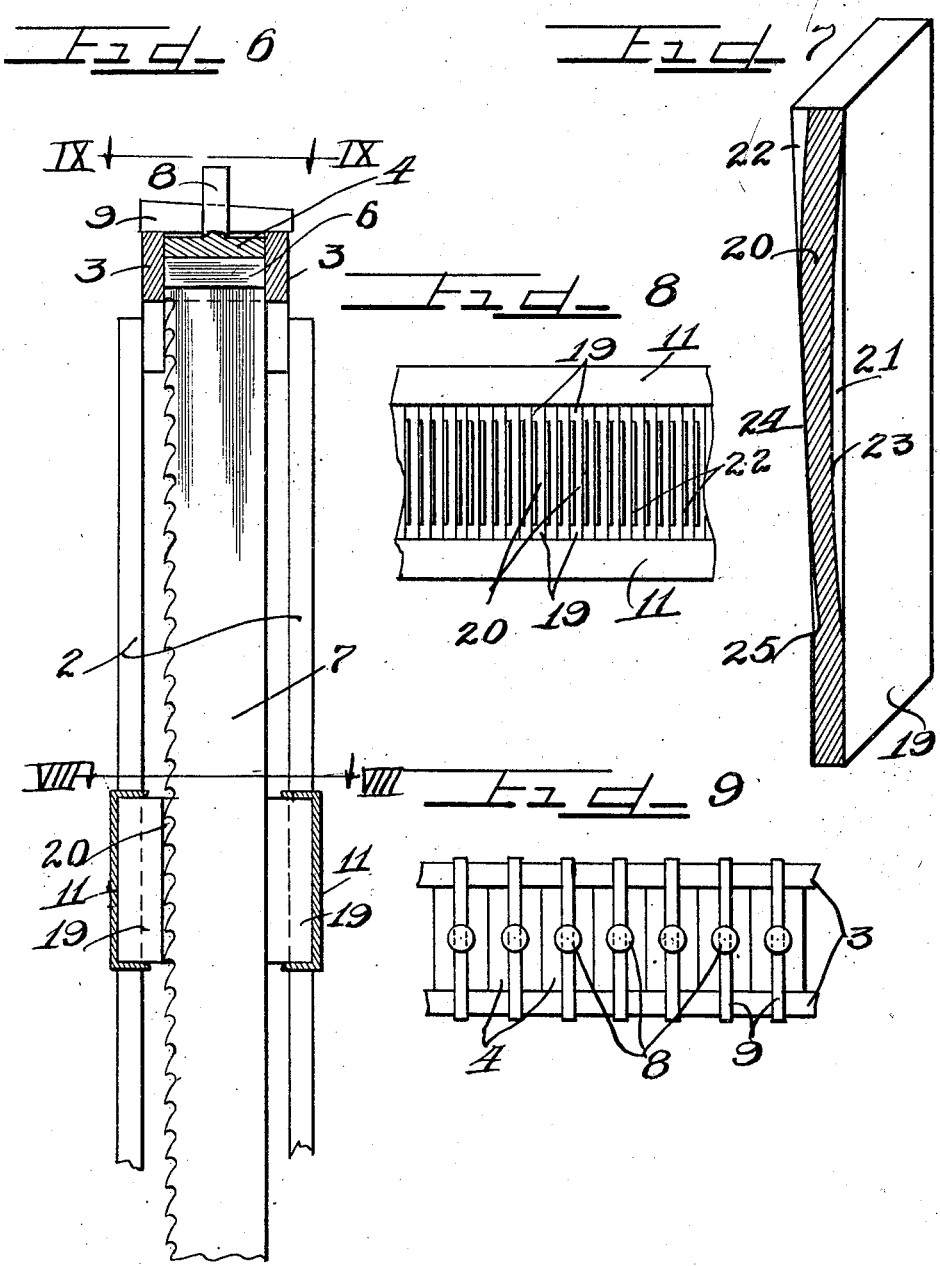

Patented June 24, 1930

1,767,390

UNITED STATES PATENT OFFICE

CHARLES F. MOSES, OF SHEBOYGAN, WISCONSIN, ASSIGNOR OF FIFTY-ONE ONE-HUNDREDTHS TO GARDNER LUMBER COMPANY, A CORPORATION OF WISCONSIN

GANG SAW

Application filed May 9, 1929. Serial No. 361,641.

Heretofore in gang saw mills, attempts have been made to make gang band saws for the purpose of cutting bolts of wood or square blocks of wood into thin boards. No practical gang band saw has been devised with saw blades adapted to be arranged closer together than approximately three-fourths of an inch apart due to the fact that these saws have been provided in saw sashes having end frame pieces which extend across the frame at substantially right angles to the cutting edges of the saws. It has been found necessary to stretch each saw blade with a special stretcher of a wedge or screw bolt type so that it has been found impossible to adequately mount the stretcher devices on the end frame pieces in a spacing arrangement which would permit less than three-fourths inch spacing of said saw blades.

This invention relates to an improved saw sash or frame provided with arcuate end frame pieces adapted to permit of a fanning out of the saw blade stretcher devices permitting said stretcher devices to be of adequate size and properly spaced for operation and at the same time permitting a close spacing of the intermediate or middle sawing portions of the saw blades to permit bolts of wood or square blocks of wood to be cut into thin boards of one-fourth inch thickness or even thinner, thereby affording a saw sash making it possible to cut up small diameter logs in the making of cheap boards for use in the construction of inexpensive shipping boxes and the like.

It is an object of this invention to provide an improved gang saw sash having arcuate end frame pieces adapted to facilitate the mounting of the blade stretchers in fanned out relation properly spaced to permit convenient operation to permit stretching of the saw blades which are so positioned that the middle portions of the saw blades are arranged in close parallel relation whereby the gang saw is adapted to cut bolts of wood or square blocks of wood into thin boards.

It is also an object of this invention to provide an improved gang saw sash wherein the end frame members are constructed to permit the saw blade stretchers to be mounted in fanned out relation to facilitate mounting of the saw blades with the middle portions of the blades positioned closely together in parallel relation by means of curved separator plates or members which are adjustably supported in cross frame members forming a part of the gang saw sash.

It is a further object of this invention to provide a gang saw for use in gang saw mills, said gang saw being provided with a sash having improved mountings permitting the saw blades to be mounted with the intermediate portions of the saw blades mounted in parallel relation and close together by means of adjustable separators carried by the sash and so arranged that the end portions of the saw blades are permitted to be fanned out to permit the ends of saw blades to be connected to stretchers which are also mounted in close fanned out relation in the arcuate end frame members of the gang saw sash.

It is furthermore an object of this invention to provide an improved gang saw sash having improved end frame members and intermediate cross members arranged to respectively carry the blade stretchers in a fanned out relation and the curved separators for the blades permitting the middle portions of the blades to be arranged closely together in parallel relation to facilitate sawing of logs or the like into very thin boards.

It is an important object of this invention to provide an improved gang saw sash arranged to permit the ends of the saw blades to be mounted in fanned out relation and further arranged with a plurality of groups of curved separators carried by cross members of the sash permitting the middle portions of the saw blades to be mounted in close spaced parallel relation with one another permitting very thin boards to be simultaneously cut from a log or block of wood.

Other and further important objects of this invention will be apparent from the disclosures in the specification and the accompanying drawings.

This invention (in a preferred form) is illustrated in the drawings and hereinafter more fully described.

On the drawings:

Figure 1 is a front vertical view of an improved gang saw sash embodying the principles of this invention.

Figure 2 is an enlarged fragmentary elevational view of the upper sash end member with front board removed to illustrate the relationship of the blade stretcher devices.

Figure 3 is an enlarged fragmentary sectional view taken vertically through one-half of one of the sash cross members illustrating the mounting arrangement of the curved separators and the screw bolt device for adjusting the same.

Figure 4 is a transverse sectional view of one of the shash cross members taken on the line IV—IV of Figure 3.

Figure 5 is an enlarged fragmentary detail sectional view of a plurality of saw separators illustrating the grooves to facilitate mounting of the gang saw blades.

Figure 6 is an enlarged vertical sectional view of the gang saw sash taken on the line VI—VI of Figure 1.

Figure 7 is an enlarged sectional perspective view of one of the gang saw separators.

Figure 8 is a fragmentary top plan view of the middle portion of one of the intermediate cross members of the gang saw sash, taken on the line VIII—VIII of Figure 6.

Figure 9 is a fragmentary top plan view taken from line IX—IX of Figure 6 and illustrating the arrangement of the gang saw stretchers.

As shown on the drawings:

The invention relates to improvements in that class of saw mills known as gang mills and primarily consists of improvements in a gang mill saw sash or frame which is of the reciprocating type and adapted to be connected to a suitable driving source by means of pitmen or connecting rods 1 which are attached to the lower ends of the two side sills 2 of the saw sash. The upper ends of the sash sills 2 are connected by a pair of spaced arcuate or segment shaped end plates or boards 3 which afford a space for the reception of a plurality of adjacently positioned stretcher blocks 4, each of which is provided with a T-slot 5 and a split saw blade mounting head or block 6, one of which is secured on each end of each of the gang saw blades 7 forming a part of the device.

Rigidly secured to the top of each of the stretcher blocks 4 is a slotted stem or arm 8 through which a wedge or key 9 projects. The wedge keys 9 project through the stretcher stems 8 and seat against the upper arcuate edges of the upper end members 3 to support the upper end of the saw blades 7 in position in the saw sash with the stretcher blocks 4 arranged in frictional contact one with the other in a fanned out relation between the two upper end plates 3 forming a part of the sash. The lower ends of the saw blades 7 are connected to stretcher devices constructed similar to those used in the upper end of the saw sash. The lower blade stretcher blocks are mounted in fanned out relation with respect to one another between a pair of spaced parallel lower end frame plates or boards 10 which are of arcuate or segmental shape permitting the lower stretcher blocks to be conveniently mounted in position with the lower end portions of the saw blades 7 fanned out as illustrated in Figure 1.

The middle portion of the saw sash is provided with a pair of cross members the ends of which are rigidly connected to the sash sills 2. Each of the cross members comprises a pair of channel bars 11. The upper and lower channel bars 11 on each side of the sash are connected by means of brace bars 12 as clearly illustrated in Figure 1. Rigidly secured in each end of each of the cross members between the members forming the sash sills is a block 13 (Figure 3) having a threaded passage therethrough for the reception of a clamping screw 14 on the outer end of which a handle or wheel 15 is engaged. The inner end of each of the clamping screws 14 is engaged in a socket or fitting 16 secured on the outer face of a slidable clamping block 17 engaged slidably between a pair of the channel cross members 11. The inner surface of each of the clamping blocks 17 has the middle portion thereof grooved and curved to afford a curved or rounded supporting surface 18 (Figure 3) against which a portion of the outermost blade 7 on one side of the sash frame is adapted to seat. Each of the intermediate or cross members of the saw sash has a pair of the clamping blocks or follower members 17 engaged therein and connected to be operated by means of the screw members 14. Engaged between the clamping blocks 17 in each of the cross members 11 are a plurality of saw blade separators, each of which comprises a block or plate having end supporting sections 19 and a curved intermediate section 20 formed by a rear groove 21 and a front groove 22. The grooves 21 and 22 extend from the top of the separator plate to within a short distance of the bottom of said plate as clearly illustrated in Figure 7 forming a rear concave surface 23 and a front convex surface 24. The front convex surface 24 curves outwardly at its lower portion to join the lower front wall of the separator to form a rounded shoulder 25. By referring to Figure 3, it will be noted that the middle separator is substantially straight and that the separators on both sides thereof curve outwardly toward the end clamping blocks 17 in a graduated relation with the curvature of the arced portions of the separators gradually increasing depending upon their distances from the center separator. This arrangement affords a fanned out arrangement of the separators permitting the saw blades 7 to be directed downwardly between the separators as indicated in Figure 3 allowing portions of the saw blades to have a curved bearing upon the convex surfaces 24 of the separators. The various saw blades are also permitted to pass over the rounded shoulders 25 of the separators and then pass from between the spaced portions of the separators with the middle portions of the saw blades substantially parallel to one another and in close proximity to one another to afford an improved gang saw arrangement of the saw blades in substantially the middle portion of the saw sash between the cross members 11 thereof.

This improved mounting of the saw blades 7 within the saw sash permits a fanning out of both ends of the saw blades due to the fanned out relationship of the saw blade stretcher devices which may be conveniently mounted in the arcuate shaped end frame members 3 and 10. The curved fanned out separators mounted in the cross members 11 between the clamping blocks 17 permit the intermediate or middle toothed portions of the saw blades to be mounted in parallel close relation to one another to permit a log or block of wood to be cut into comparatively thin boards of one-quarter inch thickness or even thinner if desired.

After the saw blades 7 and the separators have been mounted in position as hereinbefore described the clamping screws 14 are adapted to be rotated by means of the handles 15 thereby causing the followers or clamping blocks 17 to be moved inwardly to properly clamp the saw blades in proper relation to one another within the saw sash. The saw blades having the end portions thereof fanned out as described are of course adapted to be properly tensioned by means of the stretcher devices attached or connected to the ends of the saw blades by means of the wedge blocks 9.

It will of course be understood that many changes may be made and that numerous details of construction may be varied through a wide range without departing from the principles of this invention, and it is therefore not purposed limiting the patent granted hereon otherwise than necessitated by the scope of the appended claims.

I claim as my invention:

1. A gang saw mill sash comprising a pair of sills connected by intermediate cross members and by end frame members, a series of saw blades, stretchers mounted in the end frame members in fanned out relation to fan out the ends of said saw blades, and separators between the saw blades mounted adjustably within each of the frame cross members for holding the middle portions of the saw blades arranged in close parallel relation one with the other.

2. A gang saw sash comprising a frame, a series of saw blades in said frame, means carried by the frame for supporting the saw blades with the middle portions thereof spaced closely together in spaced parallel relation and with the end portions of the saw blades fanned out, and means on the frame for tensioning each of the saw blades independently of the other blades of the series.

3. A gang saw sash comprising a frame having arcuate end members, a series of saw blades mounted in said frame, adjustable separators supported in said frame between the saw blades to hold the middle portions of the saw blades associated in close spaced parallel relation, means for adjusting the separators to hold the intermediate portions of the saw blades clamped in position, and stretcher devices mounted in the arcuate end members of the frame and connected with the ends of the saw blades to tension the saw blades and position the ends of said saw blades in a fanned out arrangement.

4. A gang saw sash device of the class described comprising a frame having arcuate end members and intermediate cross members, a series of saw blades, stretcher devices mounted in the arcuate end members of the frame and connected to the ends of said saw blades to mount said saw blades with the ends thereof arranged in a fanned out relationship, grooved curved separators mounted in said frame intermediate cross members between the saw blades to hold the middle portions of said saw blades arranged in closely spaced parallel relation, clamping blocks adjustably mounted in said intermediate cross members of the frame, and screw means connected with said clamping blocks adapted to adjust said blocks and the separators to hold the saw blades properly mounted in tensioned form within the gang saw sash.

5. The combination with a gang saw sash frame and a plurality of saw blades, of curved separator means mounted on the sash frame for holding the middle portions of the saw blades spaced in close parallel relation while the ends of the saw blades are fanned out to facilitate stretching of the saw blades.

6. The combination with a gang saw sash frame, of a plurality of saw blades associated therewith, stretchers mounted in the ends of the sash frame in a fanned out arrangement and connected to the ends of said saw blades to support the same in position in a fanned out relationship, grooved separators carried by the sash frame and separting the intermediate portions of the saw blades to hold said intermediate portions of the saw blades spaced in close parallel relation one with the other, and means for clamping the separators in position in the sash frame.

7. The combination with a gang saw sash frame, of a plurality of saw blades therein, and separators positioned between the middle portions of the saw blades to hold the same spaced closely together in parallel relation, said separators arranged to gradually increase in curvature from the center of the frame outwardly toward the sides of the frame to enable the end portions of the saw blades to be held in a fanned out relationship.

8. A gang saw sash of the class described comprising a frame, a plurality of saw blades associated therewith, stretchers connected to the ends of the saw blades and supported in the ends of the sash frame in fanned out relationship to facilitate convenient operation thereof, and adjustably mounted curved separators carried by the sash frame for holding the middle sections of the saw blades closely spaced in parallel relation to facilitate cutting of logs into very thin boards.

9. A gang saw sash frame having arcuate end members, stretcher devices mounted therein in a fanned out arrangement, a plurality of saw blades connected with said stretcher devices, and separator members supported in the sash frame and engaged between the saw blades for restricting the middle section of the gang of saw blades to hold the same closely spaced in parallel relation for the cutting of thin boards from bolts of wood.

10. A gang saw sash of the class described comprising a frame having arcuate end members, stretchers mounted therein in fanned out relationship, saw blades connected with said stretchers, cross members forming part of said sash frame, groups of separators slidably mounted in said cross members and separating said saw blades, and means on said frame for clamping the separators and saw blades together to hold the middle portions of the saw blades closely associated in parallel relation with the ends of said saw blades contacting the curved portions of the separators and flaring outwardly as they approach said stretchers.

11. A gang saw sash of the class described comprising a reciprocating frame, a plurality of gang saws blades therein, means mounted on said frame in a fanned out arrangement for stretching the individual saw blades in position, and means on said frame for restricting the intermediate portion of each of the blades.

12. A gang saw sash of the class described comprising a frame, a gang saw stretched in position thereon, and transversely adjustable means carried by the frame for restricting the intermediate portion of said gang saw and for positioning said restricted portion relative to the said frame.

13. A gang saw sash of the class described comprising a frame, a gang saw stretched in position thereon, groups of separators mounted on said frame for co-action with said gang saw, and means for adjusting and clamping said separators in position to restrict the middle portion of the gang saw.

14. A gang saw sash comprising a frame, outwardly curved end members forming a part of said frame, a gang saw of a plurality of saw blades in said frame, and stretcher devices supported in fanned out relationship on said curved end members and connected with the ends of said saw blades to individually stretch the same in position.

15. The combination with a gang saw sash and a plurality of saw blades mounted thereon, of means positioned between the blades for restricting the intermediate portion of the blades to allow the end portions of the gang saw to flare out for attachment to said sash, said means comprising a plurality of separators having grooved out center portions affording curved seats for the curved portions of the gang saw blades at the points where the blades are deflected.

16. The combination with a gang saw sash and the gang saw blades thereof, of a plurality of separators between the blades for restricting the intermediate portion of the blades, each of said separators having an intermediate section with said intermediate section grooved out to afford a curved plate and a rounded shoulder to afford a suitable rest for the curved or deflected portion of a gang saw blade, the curved grooved portions affording sufficient space to prevent the blades being compressed therein.

17. A gang saw comprising a frame, a plurality of saw blades stretched in position thereon, and a plurality of groups of curved separators adjustably mounted on said frame for co-action with the blades of the said gang saw to restrict the intermediate portion of the blades, said groups of separators being arranged with the curvature of said separators gradually decreasing inwardly from the outermost separators to the middle separator whereby the end portions of certain blades are angularly directed, said end portions being connected to individual stretching devices on the end members of the said frame.

In testimony whereof I have hereunto subscribed my name at Chicago, Cook County, Illinois.

CHARLES F. MOSES.